DWIGHT HITCHCOCK, OF SYRACUSE, NEW YORK.

Letters Patent No. 84,120, dated November 17, 1868.

IMPROVED ROOFING-COMPOUND.

The Schedule referred to in these Letters Patent and making part of the same.

*To all whom it may concern:*

Be it known that I, DWIGHT HITCHCOCK, of Syracuse, in the county of Onondaga, and State of New York, have invented a new and useful Improvement in Roofing-Compound; and I do hereby declare that the following is a full, clear, and exact description thereof, which will enable those skilled in the art to make and use the same.

The following is a list of the ingredients used, and their relative proportions:

Calcareous tufa, two parts.
Marl, two parts.
Sand, one part.
Coal-tar, three parts.

These ingredients are boiled together for six hours, the mixture being constantly agitated, and at the end of this time the preparation is ready for use.

After some months have elapsed, and the compound has had time to set or become seasoned, the affinity among the several ingredients is such that it becomes as hard as stone, and does not expand or contract with changes of temperature, and clings to a wooden surface with sufficient tenacity to bring the wood off when removed.

This roofing has been tested for two years, and is found to have all the qualities necessary for great endurance, it being of a very hard and stony character, and insensible to heat or frost.

Having thus described my invention,

What I claim as new, and desire to secure by Letters Patent, is—

A roofing-compound, composed of the within ingredients, in about the proportions mentioned.

The above specification of my invention signed by me, this 28th day of September, 1868.

DWIGHT HITCHCOCK.

Witnesses:
 WM. J. DODGE,
 F. A. MORLEY.